(12) United States Patent
Uchiyama et al.

(10) Patent No.: US 12,175,753 B2
(45) Date of Patent: Dec. 24, 2024

(54) NON-TRANSITORY COMPUTER READABLE RECORDING MEDIUM, INFORMATION PROCESSING METHOD AND INFORMATION PROCESSING APPARATUS

(71) Applicants: FUJITSU LIMITED, Kawasaki (JP); University of Tsukuba, Tsukuba (JP)

(72) Inventors: Tomoki Uchiyama, Tsukuba (JP); Naoya Sogi, Tsukuba (JP); Koichiro Niinuma, Pittsburgh, PA (US); Kazuhiro Fukui, Tsukuba (JP)

(73) Assignees: FUJITSU LIMITED, Kawasaki (JP); UNIVERSITY OF TSUKUBA, Tsukuba (JP)

( * ) Notice: Subject to any disclaimer, the term of this patent is extended or adjusted under 35 U.S.C. 154(b) by 364 days.

(21) Appl. No.: 17/867,701

(22) Filed: Jul. 19, 2022

(65) Prior Publication Data
US 2024/0029434 A1 Jan. 25, 2024

(51) Int. Cl.
G06K 9/62 (2022.01)
G06T 7/20 (2017.01)
G06V 10/774 (2022.01)
G06V 10/82 (2022.01)
G06V 20/40 (2022.01)

(52) U.S. Cl.
CPC .......... *G06V 20/41* (2022.01); *G06T 7/20* (2013.01); *G06V 10/774* (2022.01); *G06V 10/82* (2022.01); *G06T 2207/10016* (2013.01); *G06T 2207/20081* (2013.01); *G06T 2207/20084* (2013.01)

(58) Field of Classification Search
CPC ...... G06V 20/41; G06V 10/774; G06V 10/82; G06V 20/46; G06T 7/20; G06T 2207/10016; G06T 2207/20081; G06T 2207/20084
See application file for complete search history.

(56) References Cited

FOREIGN PATENT DOCUMENTS

| CN | 110008904 A | * | 7/2019 | ....... G06F 18/23213 |
|----|-------------|---|--------|----------------------|
| CN | 110650379 A | * | 1/2020 | ........... G06K 9/6218 |
| CN | 113436100 A | * | 9/2021 | ............. G06N 3/044 |
| TW | 202105202 A | * | 2/2021 | ......... G06K 9/00718 |

OTHER PUBLICATIONS

Zeiler et al., "Visualizing and Understanding Convolutional Networks", (eds)Computer Vision—ECCV 2014. Part I Lecture Notes in Computer Science (LNCS), vol. 8689. Springer, 2014, pp. 818-833.

* cited by examiner

*Primary Examiner* — Xin Jia
(74) *Attorney, Agent, or Firm* — XSENSUS LLP

(57) ABSTRACT

A non-transitory computer-readable recording medium has stored therein a program that causes a computer to execute a process, the process including acquiring movie data including a plurality of consecutive frames calculating first likelihood of a class of the movie data by inputting the acquired movie data to a trained model, calculating an optical flow indicating movement of an area included in the movie data, based on the movie data generating occluded movie data by setting an occluded area in each of the frames included in the movie data, based on the optical flow, calculating second likelihood of a class of the occluded movie data by inputting the occluded movie data to the model identifying an area that affects identification of the class among areas in the movie data, based on the first likelihood and the second likelihood and displaying the identified area that affects identification of the class.

12 Claims, 13 Drawing Sheets

FIG.3

| ITEM NUMBER | OCCLUDED MOVIE DATA | OCCLUDED AREA COORDINATE | LIKELIHOOD |
|---|---|---|---|
| 1 | OCCLUDED MOVIE DATA WITH ITEM NUMBER 1 | COORDINATE OF OCCLUDED AREA SET IN EACH OF FRAMES OF OCCLUDED MOVIE DATA WITH ITEM NUMBER 1 | RECOGNITION CLASS LIKELIHOOD OBTAINED WHEN OCCLUDED MOVIE DATA WITH ITEM NUMBER 1 IS INPUT TO 3D-CNN |
| 2 | OCCLUDED MOVIE DATA WITH ITEM NUMBER 2 | COORDINATE OF OCCLUDED AREA SET IN EACH OF FRAMES OF OCCLUDED MOVIE DATA WITH ITEM NUMBER 2 | RECOGNITION CLASS LIKELIHOOD OBTAINED WHEN OCCLUDED MOVIE DATA WITH ITEM NUMBER 2 IS INPUT TO 3D-CNN |
| 3 | OCCLUDED MOVIE DATA WITH ITEM NUMBER 3 | COORDINATE OF OCCLUDED AREA SET IN EACH OF FRAMES OF OCCLUDED MOVIE DATA WITH ITEM NUMBER 3 | RECOGNITION CLASS LIKELIHOOD OBTAINED WHEN OCCLUDED MOVIE DATA WITH ITEM NUMBER 3 IS INPUT TO 3D-CNN |
| ... | ... | ... | ... |

142

NON-TRANSITORY COMPUTER READABLE RECORDING MEDIUM, INFORMATION PROCESSING METHOD AND INFORMATION PROCESSING APPARATUS

FIELD

The embodiment discussed herein is related to a non-transitory computer readable recording medium having stored therein an information processing program, an information processing method, and an information processing apparatus.

BACKGROUND

A deep learning model (hereinafter, referred to as a DL model) is used to recognize a class of a still image or a moving image.

A technology for recognizing a still image is called still image recognition, and a two-dimensional-convolutional neural network (2D-CNN) is used as the DL model. In the still image recognition, a single still image (width×height) is input to the 2D-CNN, and a recognition class of a target object (likelihood of a dog, a cat, or the like) that is included in the single still image is output.

In contrast, a technology for recognizing a moving image is called moving image recognition, and a three-dimensional (3D)-CNN is used as the DL model. A movie includes chronological frames (still images). In the moving image recognition, a moving image (width×height×the number of frames) is input to the 3D-CNN, and a single recognition class is output. In the moving image recognition, a scene represented by the moving image is recognized from a sequence of movement in the moving image.

FIG. 10 is a diagram illustrating an example of a recognition result of the moving image recognition. For example, if a movie Mv10 is input to the 3D-CNN, a recognition class of "punching" is output. If a movie Mv11 is input to the 3D-CNN, a recognition class of "mopping floor" is output.

Here, the DL models (the 2D-CNN and the 3D-CNN) as described above are usually handled as black boxes; however, it is possible to improve performance of the DL models and safely use the DL models by understanding a basis of behaviors of the DL models, and therefore, a technology for visualizing the DL models is needed.

For example, as a conventional technology for visualizing the 2D-CNN, an occlusion sensitivity map (OSM) or the like is known. In the conventional technology (OSM or the like), when a DL model identifies a class of image data, an image area that is important in identification is visualized.

FIG. 11 is a diagram for explaining the conventional technology. In the conventional technology, a plurality of occluded images are generated while changing a position of an occluded area with respect to an original image IM10. For example, an occluded image IM10-1 is generated by setting an occluded area 11-1 in the image IM10. In the conventional technology, the same applies to the other images, that is, occluded images IM10-2 to 10-8 are generated by setting occluded areas 11-2 to 11-8 in the image IM10.

In the conventional technology, the image IM10 in which an occluded area is not set is input to the 2D-CNN, and a class similarity that is used as a reference is calculated. The class similarity that is used as the reference will be described as a reference class similarity.

In the conventional technology, the occluded image IM10-1 is input to the 2D-CNN, and a class similarity of the occluded image IM10-1 is calculated. In the conventional technology, the same applies to the other images, that is, the occluded images IM10-2 to 10-8 are input to the 2D-CNN, and class similarities of the occluded images IM10-2 to 10-8 are calculated.

In the conventional technology, the class similarity of each of the occluded images IM10-1 to 10-8 is compared with the reference class similarity, an occluded image for which the class similarity is largely reduced is identified, and the occluded area of the identified occluded image is displayed in an emphasized manner as an area that is important in identifying a class.

FIG. 12 is a diagram illustrating a processing result according to the conventional technology. In FIG. 12, an image IM15 is used as an original image that is used to visualize the 2D-CNN. An execution result 5 indicates an execution result of the conventional technology, in which an area 5a is displayed in an emphasized manner as an area that is important in identifying a class.

Non-Patent Literature 1: Zeiler M. D., Fergus R. "Visualizing and Understanding Convolutional Networks" In: Fleet D., Pajdla T., Schiele B., Tuytelaars T. (eds) Computer Vision—ECCV 2014. Lecture Notes in Computer Science, vol 8689. Springer, Cham However, there is a problem in that the conventional technology as described above is not applicable to a network, such as the 3D-CNN, that performs moving image recognition.

For example, in the conventional technology, an occluded area that is set in a still image does not follow the movement of the area corresponding to the occluded area, and therefore, it is difficult to obtain a visualization result that can be understood by a user.

FIG. 13 is a diagram for explaining a problem with the conventional technology. If an existing OSM is applied as it is to the 3D-CNN, an occluded area is always set at the same position regardless of a change in the position of a pixel in a movie. In FIG. 13, pieces of movie data Mv20a, 20b, 20c, and 20d are illustrated. Each piece of movie data Mv20a to 20d is movie data that is input to the 3D-CNN, and chronological frames included in each of the movies are stacked. If the movie data Mv20a is applied as it is to the OSM, an occluded area 21 is set in a first frame of the movie data Mv20a, and the occluded area 21 is also set at the same position in each of subsequent frames. The same applies to the pieces of movie data Mv20b to 20d, that is, the occluded area 21 is set in a first frame and the occluded area 21 is also set at the same position in each of subsequent frames. As illustrated in FIG. 13, if the occluded area 21 is set at the same position as in the first frame, in some cases, a different area may be occluded in each of the frames, so that it becomes difficult to identify the influence of an output result caused by occlusion of a specific area.

According to one aspect, an object of the present invention is to provide a non-transitory computer readable recording medium having stored therein an information processing program capable of visualizing an area that is important in identifying a class among areas included in a movie, an information processing method, and an information processing apparatus.

SUMMARY

According to one embodiment, a non-transitory computer-readable recording medium has stored therein a visualization program that causes a computer to execute a process, the process including: acquiring movie data including a plurality of consecutive frames; calculating first likelihood of a class of the movie data by inputting the acquired movie data to a trained model that has been trained based on training data including input data of the movie data and output data of a class of the movie data; calculating an optical flow indicating movement of an area included in the movie data, based on the movie data; generating occluded movie data by setting an occluded area in each of the frames included in the movie data, based on the optical flow; calculating second likelihood of a class of the occluded movie data by inputting the occluded movie data to the model; identifying an area that affects identification of the class among areas in the movie data, based on the first likelihood and the second likelihood; and displaying the identified area that affects identification of the class.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of a data structure of an occluded movie table;

DESCRIPTION OF EMBODIMENT(S)

Embodiments of a non-transitory computer readable recording medium having stored therein an information processing program, an information processing method, and an information processing apparatus disclosed in the present application will be described in detail below based on the drawings. The disclosed technology is not limited by the embodiments below. In addition, the embodiments below may be combined appropriately as long as no contradiction is derived.

Figure 1:
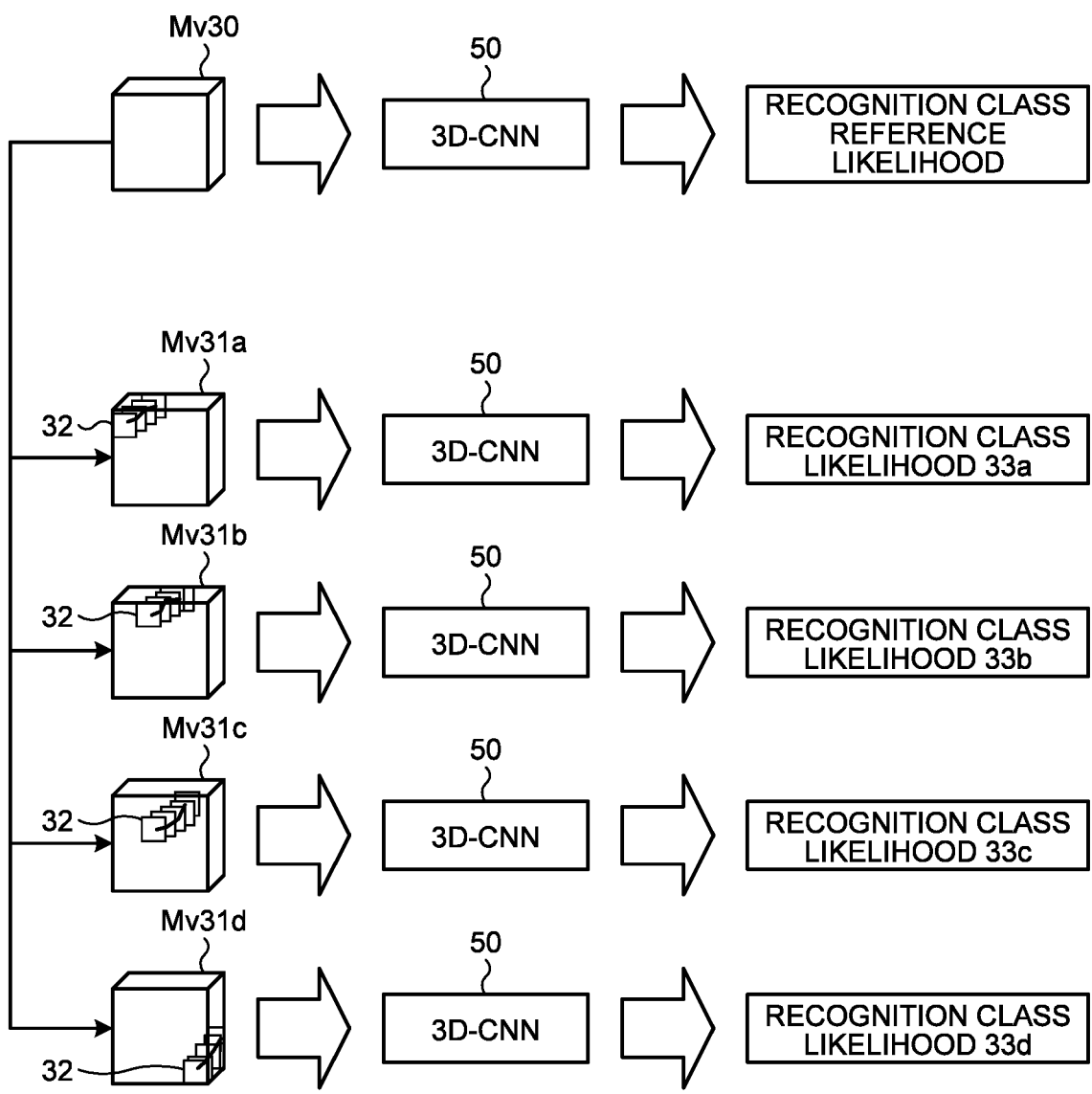
FIG. 1 is a diagram for explaining a process performed by an information processing apparatus according to an embodiment.

An example of a process performed by an information processing apparatus according to one embodiment will be described below. FIG. 1 is a diagram for explaining the process performed by the information processing apparatus according to the present embodiment. The information processing apparatus inputs movie data Mv30 including chronological frames to a trained 3D-CNN 50, and calculates recognition class likelihood. The 3D-CNN 50 is a neural network (NN) that inputs movie data and outputs recognition class likelihood (for example, a scene of a movie, such as punching, mopping floor, or the like). Hereinafter, the trained 3D-CNN 50 will be simply described as the 3D-CNN 50. Furthermore, the recognition class likelihood that is obtained by inputting the movie data Mv30 to the 3D-CNN 50 will be described as "reference likelihood".

The information processing apparatus calculates an optical flow that indicates movement of each of pixels included in the movie data Mv30, on the basis of the movie data Mv30. The optical flow is information that represents, by a vector, movement of each of the pixels between the frames included in the movie data Mv30. Meanwhile, the information processing apparatus may calculate the optical flow with respect to a predetermined target object, instead of calculating the optical flow with respect to each of the pixels of the movie data Mv30.

The information processing apparatus sets an occluded area 32 in the first frame of the movie data Mv30, subsequently sets the occluded area 32 in each of subsequent frames while moving the occluded area 32 on the basis of the optical flow of each of pixels included in the occluded area 32, and generates piece of occluded movie data Mv31a, Mv31b, Mv31c, and Mv31d. In the pieces of occluded movie data Mv31a to Mv31d, the positions of the occluded areas 32 that are set in the respective first frames are different.

The information processing apparatus inputs the movie data Mv31a to the 3D-CNN 50, and calculates recognition class likelihood 33a. The information processing apparatus inputs the movie data Mv31b to the 3D-CNN 50, and calculates recognition class likelihood 33b. The information processing apparatus inputs the movie data Mv31c to the 3D-CNN 50, and calculates recognition class likelihood 33c. The information processing apparatus inputs the movie data Mv31d to the 3D-CNN 50, and calculates the recognition class likelihood 33d.

If a difference between recognition class reference likelihood and the recognition class likelihood is equal to or larger than a threshold, the area that is occluded by the occluded area 32 in each of the frames of the movie data is determined as an area that is important in identifying a behavior of the 3D-CNN 50, and therefore, the information processing apparatus displays the area in an emphasized manner.

For example, if a difference between the recognition class reference likelihood and the recognition class likelihood 33a is equal to or larger than the threshold, the information processing apparatus displays an area that is included in each of the frames of the movie data Mv31a and that corresponds to the occluded area 32 in an emphasized manner.

If a difference between the recognition class reference likelihood and the recognition class likelihood 33b is equal to or larger than the threshold, the information processing apparatus displays an area that is included in each of the frames of the movie data Mv31b and that corresponds to the occluded area 32 in an emphasized manner.

If a difference between the recognition class reference likelihood and the recognition class likelihood 33c is equal to or larger than the threshold, the information processing apparatus displays an area that is included in each of the frames of the movie data Mv1c and that corresponds to the occluded area 32 in an emphasized manner.

If a difference between the recognition class reference likelihood and the recognition class likelihood 33d is equal to or larger than the threshold, the information processing apparatus displays an area that is included in each of the frames of the movie data Mv31d and that corresponds to the occluded area 32 in an emphasized manner.

As described above, the information processing apparatus according to the present embodiment generates the occluded movie data in which the occluded area is set in each of the frames while moving the occluded area in accordance with movement of the optical flow of each of the pixels calculated from the movie data, and compares a result that is obtained by inputting the movie data to the 3D-CNN 50 and a result that is obtained by inputting the occluded movie data to the 3D-CNN 50. In the occluded movie data, the position of the occluded area is changed in accordance with movement of the pixels corresponding to the occluded area, and if a comparison result indicates mismatch, it is determined that an area that is occluded by the occluded area is an important area in identifying a behavior of the 3D-CNN 50, so that it is possible to visualize the area that is important in identifying a class by displaying the area in an emphasized manner.

Figure 2:
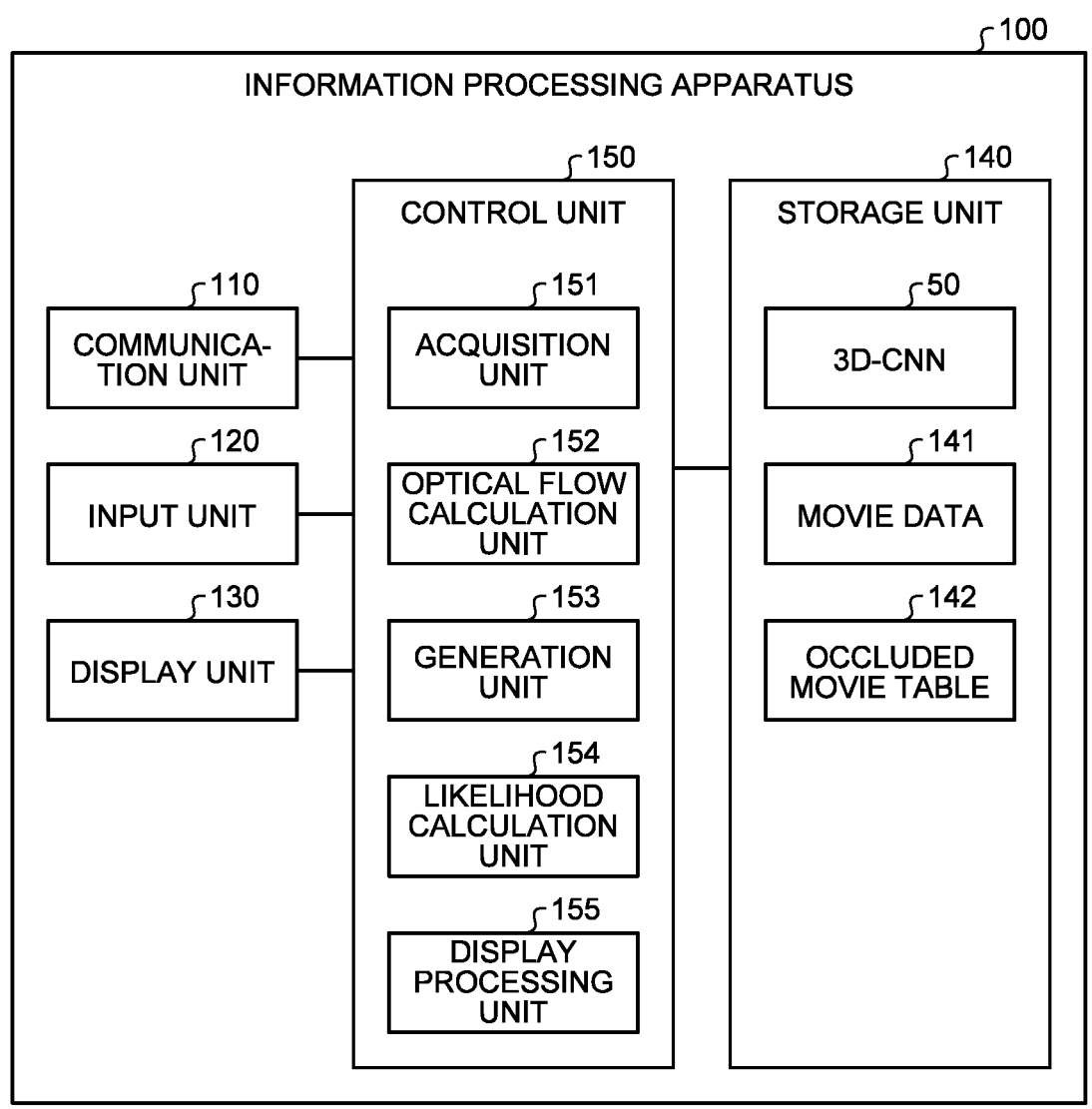
FIG. 2 is a functional block diagram illustrating a configuration of the information processing apparatus according to the present embodiment.

A configuration example of the information processing apparatus according to the present embodiment will be described below. FIG. 2 is a functional block diagram illustrating a configuration of the information processing apparatus according to the present embodiment. As illustrated in FIG. 2, an information processing apparatus 100 includes a communication unit 110, an input unit 120, a display unit 130, a storage unit 140, and a control unit 150.

The communication unit 110 performs data communication with an external apparatus or the like via a network. The communication unit 110 receives movie data 141 that is a processing target from the external apparatus. The communication unit 110 may receive data of the trained 3D-CNN 50 from an external apparatus.

The input unit 120 is an input device that receives operation from a user, and is implemented by, for example, a keyboard, a mouse, or the like.

The display unit 130 is a display device for outputting a processing result obtained by the control unit 150, and is implemented by, for example, a liquid crystal monitor, a printer, or the like.

The storage unit 140 stores therein the 3D-CNN the movie data 141, and an occluded movie table 142. The storage unit 140 is a storage device for storing various kinds of information, and is implemented by, for example, a semiconductor memory device, such as a random access memory (RAM) or a flash memory, or a storage device, such as a hard disk or an optical disk.

The 3D-CNN 50 is a NN that inputs movie data and outputs recognition class likelihood (for example, a scene of a movie, such as punching, mopping floor, or the like).

The movie data 141 is processing target movie data. For example, the movie data 141 includes chronological frames (still images). Each of the frames is assigned with a frame number in chronological order. Each of the frames includes a plurality of pixels, and a pixel value is set for each of the pixels. By setting an occluded area in each of the frames of the movie data 141, occluded movie data is generated.

The occluded movie table 142 is a table for storing therein a plurality of pieces of occluded movie data. FIG. 3 is a diagram illustrating an example of a data structure of the occluded movie table. As illustrated in FIG. 3, the occluded movie table 142 contains an item number, occluded movie data, an occluded area coordinate, and likelihood.

The item number is a number for identifying a record (occluded movie data) of the occluded movie table 142. The occluded movie data includes chronological frames, and a partial area (small area) is occluded in each of the frames.

In the occluded area coordinate, a coordinate of the occluded area that is set in each of the frames of the occluded movie data is set. For example, in the coordinate of the occluded area of each of the frames, a coordinate of an upper left corner of the occluded area and a coordinate of a lower right corner of the occluded area are set.

In the likelihood, recognition class likelihood that is obtained when the occluded movie data is input to the 3D-CNN 50 is set.

Referring back to explanation of FIG. 2, the control unit 150 is implemented by causing a processor, such as a central processing unit (CPU) or a micro processing unit (MPU), to execute various programs that are stored in a storage device provided in the information processing apparatus 100, by using a RAM or the like as a work area. Furthermore, the control unit 150 may be implemented by an integrated circuit, such as an application specific integrated circuit (ASIC) or a field programmable gate array (FPGA).

The control unit 150 includes an acquisition unit 151, an optical flow calculation unit 152, a generation unit 153, a likelihood calculation unit 154, and a display processing unit 155.

The acquisition unit 151 acquires the movie data 141 from an external apparatus or the like. The acquisition unit 151 registers the acquired movie data 141 in the storage unit 140. The acquisition unit 151 may acquire the movie data 141 via the input unit 120.

Figure 4:
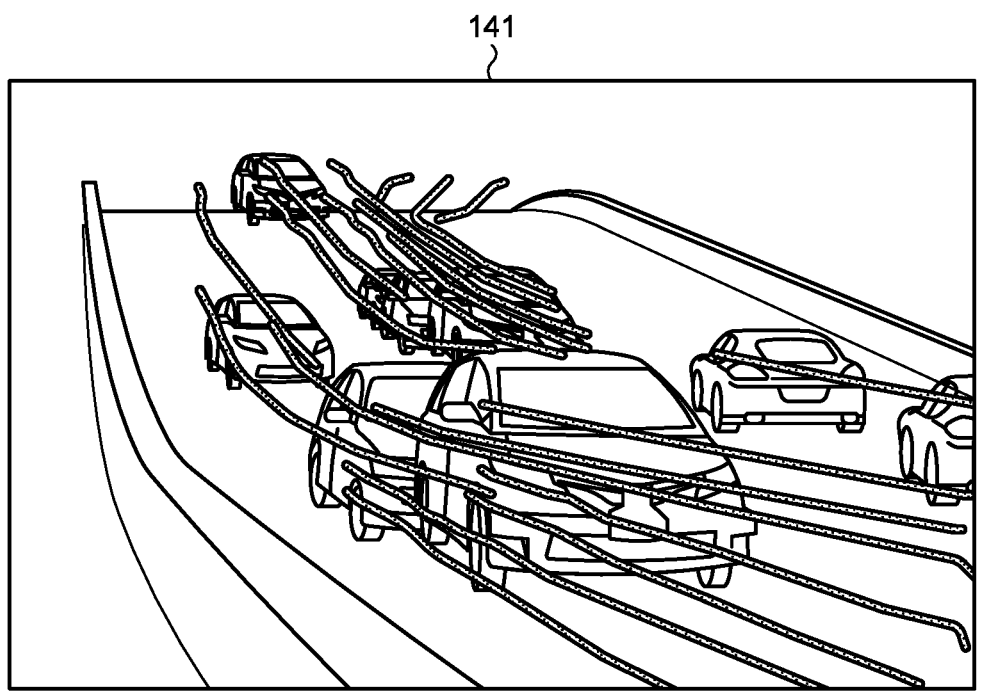
FIG. 4 is a diagram illustrating an example of optical flows.

The optical flow calculation unit 152 calculates an optical flow on the basis of the chronological frames included in the movie data 141. FIG. 4 is a diagram illustrating an example of optical flows. In the example illustrated in FIG. 4, sparse optical flows are illustrated so that a plurality of optical flows calculated from the movie data 141 can be viewed easily; however, in reality, the optical flow is calculated for each of pixels of the movie data 141. For example, the optical flow calculation unit 152 calculates the optical flow for each of the pixels of the movie data 141 on the basis of the Lucas-Kanade method or the like. For example, the optical flow calculation unit 152 calculates a position to which, in a frame T+1, a certain pixel that has been located at (x, y) in a frame T has moved, for all of the pixels.

The optical flow calculation unit 152 outputs calculation results of the optical flows to the generation unit 153.

The generation unit 153 sets an occluded area in the first frame of the movie data 141, sets the occluded area in each of subsequent frames while moving the occluded area on the basis of the optical flows of the pixels included in the occluded area, and generates the occluded movie data.

Figure 5:
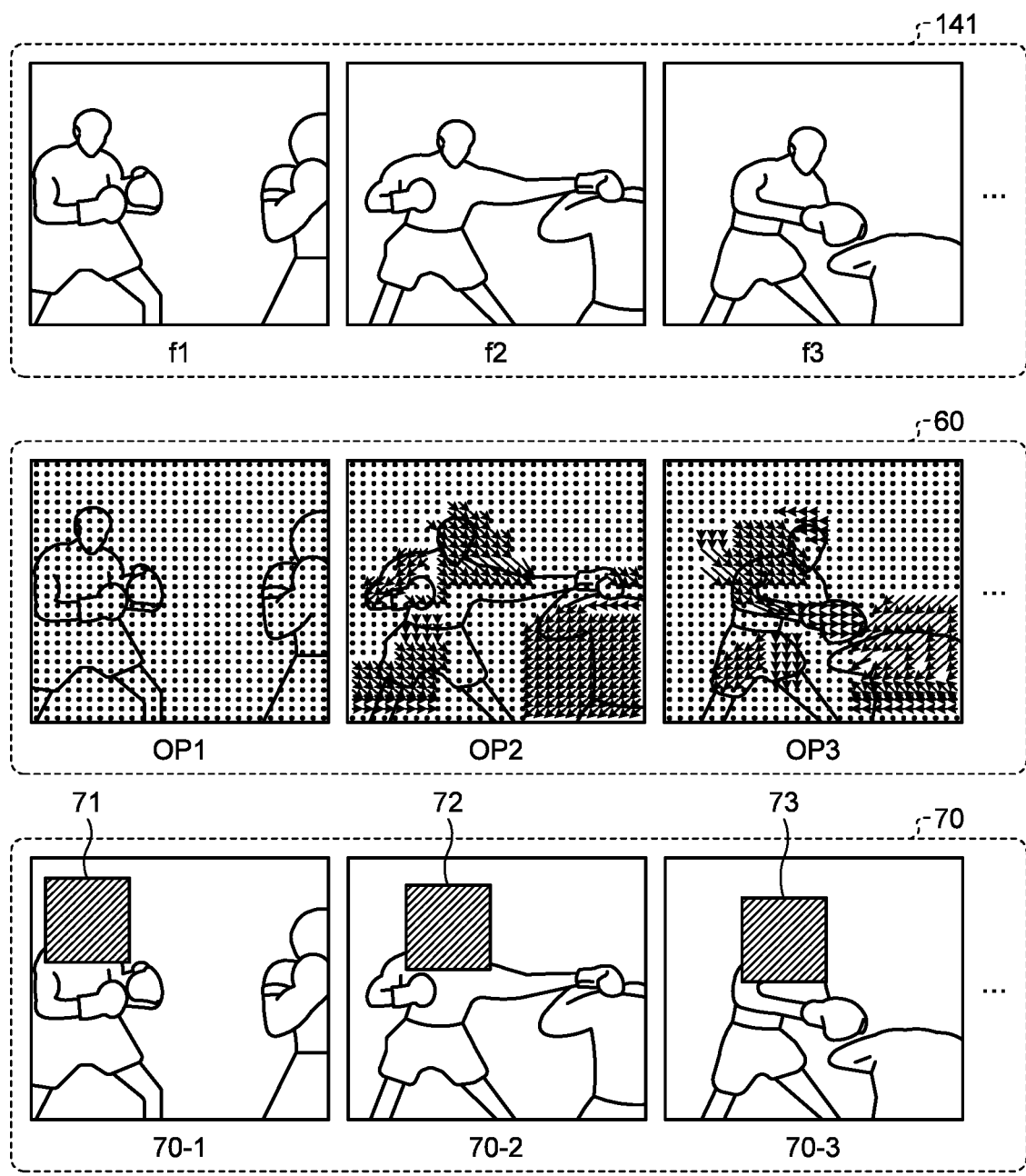
FIG. 5 is a diagram for explaining a process of generating occluded movie data.

FIG. 5 is a diagram for explaining a process of generating the occluded movie data. As illustrated in FIG. 5, the movie data 141 includes a plurality of chronological frames f1, f2, f3, . . . . In an optical flow 60, a vector of each of the pixels from the n-th frame to the n+1-th frame is set. The optical flows 60 corresponding to the frames f1, f2, and f3 are described as optical flows OP1, OP2, and OP3, respectively.

The generation unit 153 generates occluded image data 70-1 by setting an occluded area 71 with h×w in the frame f1 of the movie data 141. The generation unit 153 identifies an area as a movement destination of each of pixels corresponding to the occluded area 71 on the basis of the optical flows OP1 and OP2. The generation unit 153 generates occluded image data 70-2 by setting an occluded area 72 in the frame f2 in accordance with the area that is identified as the movement destination.

The generation unit 153 identifies an area as a movement destination of each of pixels corresponding to the occluded area 72 on the basis of the optical flows OP2 and OP3. The generation unit 153 generates occluded image data 70-3 by setting an occluded area 73 in the frame f3 in accordance with the area that is identified as the movement destination.

The generation unit 153 generates movie data 70 by repeating the processes as described above on the subsequent frames.

Furthermore, the generation unit 153 generates a plurality of pieces of occluded movie data by changing a position of the occluded area that is set in the first frame. The generation unit 153 may arbitrarily set the position of the occluded area that is set in the first frame. The generation unit 153 may set the occluded area while shifting the occluded area by predetermined pixels at a time. The generation unit 153 registers, in the occluded movie table 142, the plurality of pieces of generated occluded movie data and information on the coordinate of the occluded area set in each of the frames.

The likelihood calculation unit 154 calculates the recognition class reference likelihood by inputting the movie data 141 to the 3D-CNN 50. Further, the likelihood calculation unit 154 calculates the recognition class likelihood by inputting the occluded movie data registered in the occluded movie table 142 to the 3D-CNN 50, and registers the calculated likelihood in the occluded movie table 142.

If a difference between the recognition class reference likelihood and the recognition class likelihood is equal to or larger than a threshold, the likelihood calculation unit 154 determines that the occluded area in each of the frames of the corresponding occluded movie data is an area that affects identification of a class.

The likelihood calculation unit 154 repeats the processes as described above for each piece of occluded movie data registered in the occluded movie table 142. In the following descriptions, a piece of occluded movie data for which the occluded area in each of frames is determined as an area that affects identification of a class among piece of occluded movie data will be referred to as "target occluded movie data".

The likelihood calculation unit 154 outputs the item number of the target occluded movie data to the display control unit 155.

The display control unit 155, when outputting the movie data 141 to the display unit 130, displays an area that is important in identifying a class in an emphasized manner. For example, the display control unit 155 identifies an area (occluded area coordinate) that is included in each of the frames and that is important in identifying a class on the basis of the item number of the target occluded movie data and the occluded movie table 142, and displays the corresponding area of each of the frames of the movie data 141 in an emphasized manner.

Figure 6:
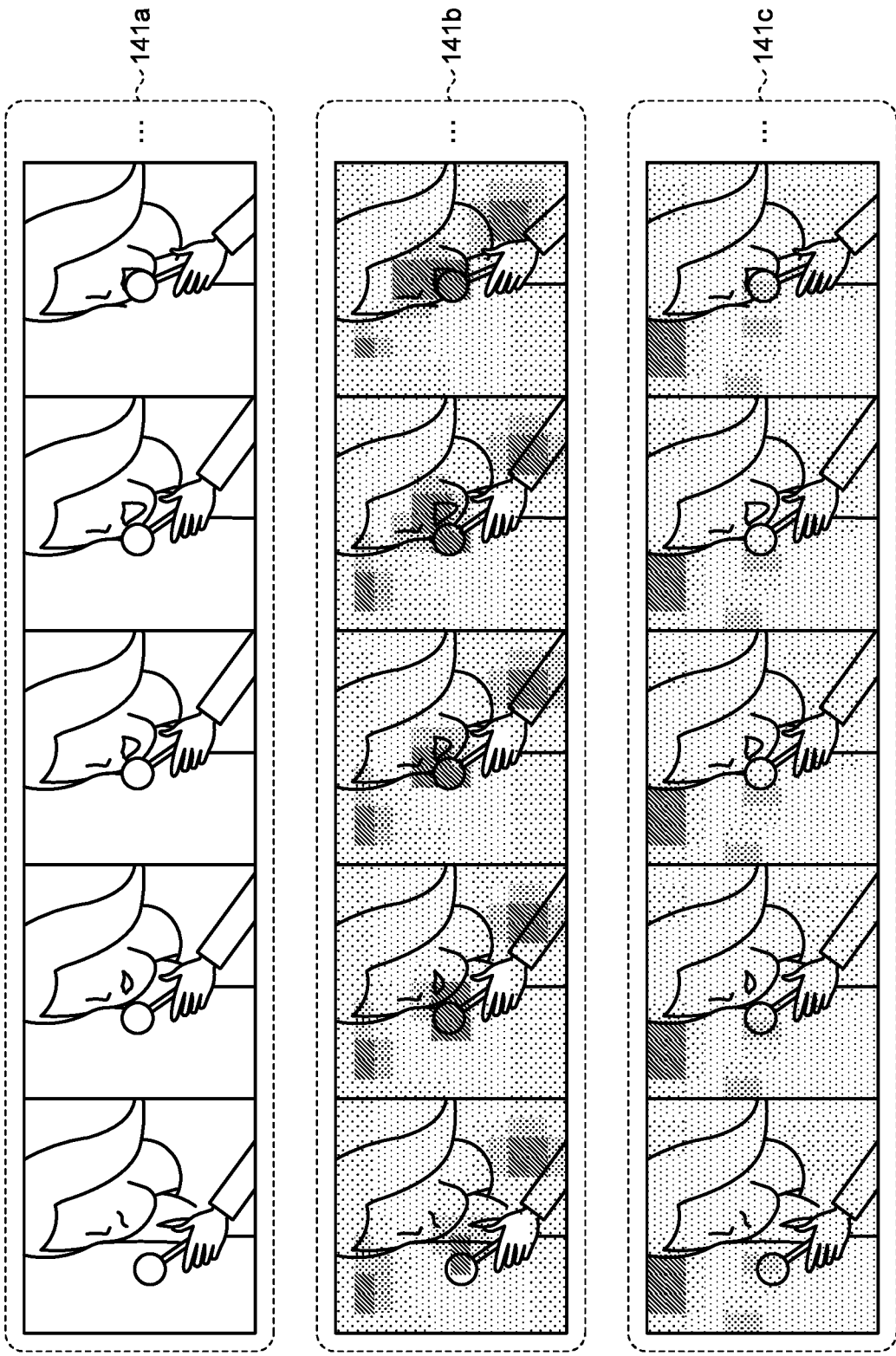
FIG. 6 is a diagram illustrating an example of an output result of a display control unit.

FIG. 6 is a diagram illustrating an example of an output result of the display control unit. In the example illustrated in FIG. 6, movie data 141*b* that is displayed in an emphasized manner is displayed in association with movie data 141*a* that is not emphasized. In the movie data 141*b*, an area of a tool (tooth brush) that is held by a person is displayed in an emphasized manner, and it is easily understandable that the emphasized area is an area that is important in identifying a class. Meanwhile, movie data 141*c* is an example of movie data that is displayed in an emphasized manner by applying an existing OSM as it is to the 3D-CNN 50. In the movie data 141*c*, an area that is located in an upper left portion and that does not contribute to identification of a class is displayed in an emphasized manner, and it it difficult to understand an area that is important in identifying a class.

Figure 7:
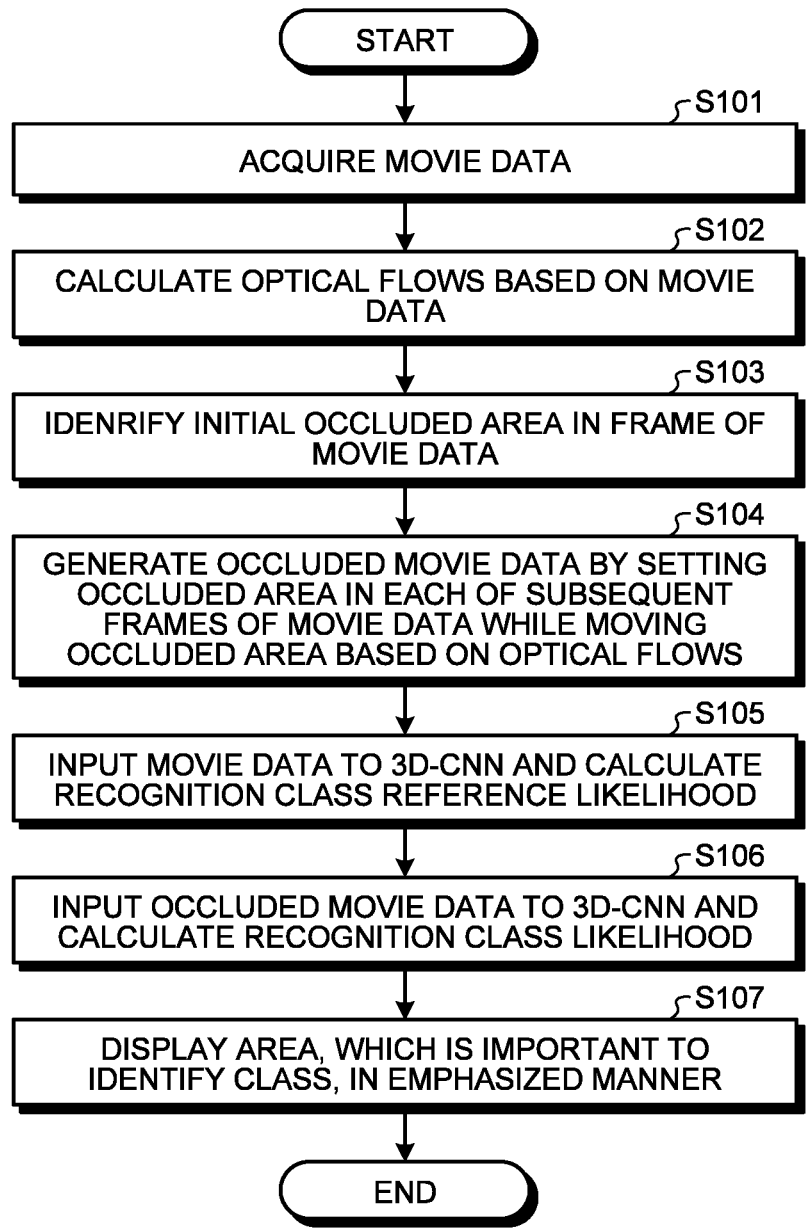
FIG. 7 is a flowchart illustrating the flow of a process performed by the information processing apparatus according to the present embodiment.

An example of the flow of a process performed by the information processing apparatus 100 according to the present embodiment will be described below. FIG. 7 is a flowchart illustrating the flow of a process performed by the information processing apparatus according to the present embodiment. As illustrated in FIG. 7, the acquisition unit 151 of the information processing apparatus 100 acquires the movie data 141 (Step S101). The optical flow calculation unit 152 of the information processing apparatus 100 calculates optical flows on the basis of the movie data 141 (Step S102).

The generation unit 153 of the information processing apparatus 100 identifies an initial occluded area in a frame of the movie data 141 (Step S103). The generation unit 153 generates occluded movie data by setting an occluded area in each of subsequent frames of the movie data while moving the occluded area on the basis of the optical flows (Step S104).

The likelihood calculation unit 154 of the information processing apparatus 100 inputs the movie data 141 to the 3D-CNN 50, and calculates the recognition class reference likelihood (Step S105). The likelihood calculation unit 154 inputs the occluded movie data to the 3D-CNN 50 and calculates the recognition class likelihood (Step S106).

The display control unit 155 of the information processing apparatus 100 displays, in an emphasized manner, an area that is important in identifying a class (Step S107).

Effects achieved by the information processing apparatus 100 according to the present embodiment will be described below. The information processing apparatus 100 generates the occluded movie data in which the occluded area is set in each of the frames while moving the occluded area in accordance with movement of the optical flows calculated from the movie data, and compares a result that is obtained by inputting the movie data to the 3D-CNN 50 and a result that is obtained by inputting the occluded movie data to the 3D-CNN 50. In the occluded movie data, the position of the occluded area is changed in accordance with movement of the pixels corresponding to the occluded area, and if a comparison result indicates mismatch, it is determined that an area that is occluded by the occluded area is an important area in identifying a behavior of the 3D-CNN 50, so that it is possible to visualize the area that is important in identifying a class by displaying the area in an emphasized manner.

Meanwhile, the process performed by the information processing apparatus 100 as described above is one example, and the information processing apparatus 100 may perform different processes. Different processes 1 and 2 performed by the information processing apparatus 100 will be described below.

The different process 1 performed by the information processing apparatus 100 will be described below. The generation unit 153 of the information processing apparatus 100 as described above sets an occluded area in the first frame of the movie data 141, sets an occluded area in each of subsequent frames while moving the occluded area on the basis of optical flows of pixels that are included in the occluded area, and generates the occluded movie data; however, embodiments are not limited to this example.

The generation unit 153 randomly determines a frame number and a position of an occluded area. The occluded area whose position is randomly determined is set in a frame with a randomly-determined frame number (for example, the frame number n) among the frames included in the movie data 141. The generation unit 153 sets an occluded area in a subsequent frame of the frame number n while moving the occluded area on the basis of the optical flows, and generates the occluded image data.

With this configuration, it is possible to set the occluded area even in a target area that is not included in the first frame of the movie data 141 and that appears from a middle frame.

Figure 8:
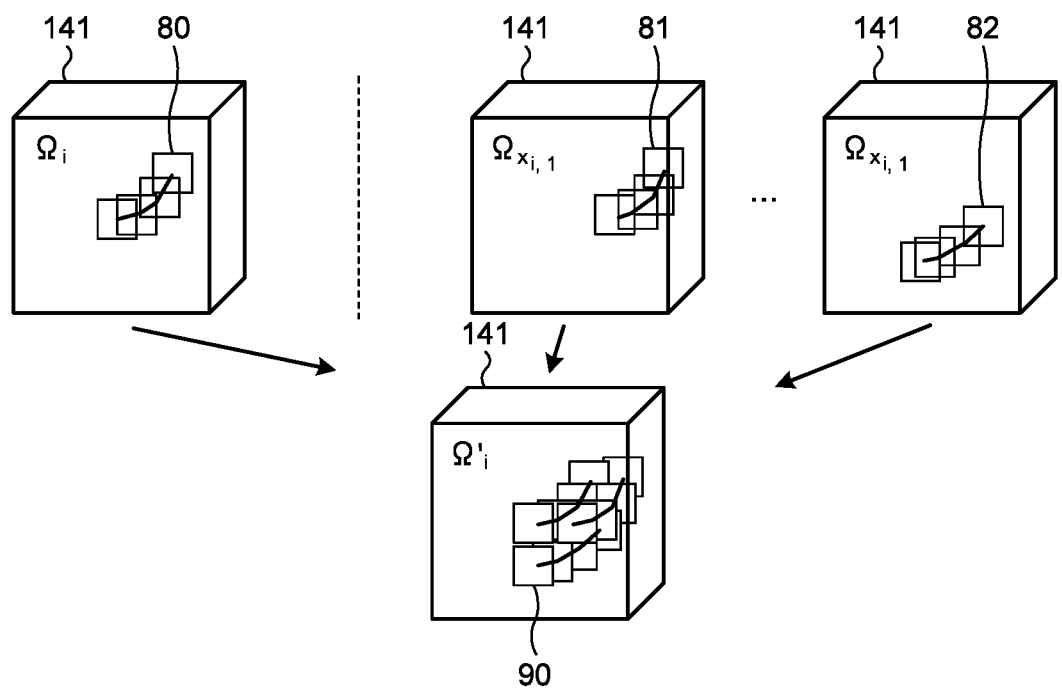
FIG. 8 is a diagram for explaining another process performed by the information processing apparatus.

The different process 2 performed by the information processing apparatus 100 will be described below. The generation unit 153 may generate occluded movie data by integrating a plurality of occluded areas. FIG. 8 is a diagram for explaining the different process performed by the information processing apparatus.

The generation unit 153 sets an initial occluded area in an area 80 in the first frame of the movie data 141, sets an occluded area in each of subsequent frames while moving the occluded area on the basis of optical flows of pixels that are included in the occluded area, and generates a series of occluded areas $\Omega_i$. The generation unit 153 sets an initial occluded area in an area 81 in the first frame of the movie data 141, sets an occluded area in each of subsequent frames while moving the occluded area on the basis of optical flows of pixels that are included in the occluded area, and generates a series of occluded areas $\Omega_{xi}, \ldots, \Omega_j$. The generation unit 153 sets an initial occluded area in an area 82 in the first frame of the movie data 141, sets an occluded area in each of subsequent frames while moving the occluded area on the basis of optical flows of pixels that are included in the occluded area, and generates a series of occluded areas $\Omega_{xi}, \ldots, \Omega_k$.

The generation unit 153 generates occluded movie data 90 in which a series of occluded areas $\Omega'_i$ is set by integrating the series of occluded areas $\Omega_i$, the series of occluded areas $\Omega_{xi}, \ldots, \Omega_j$, and the series of occluded areas $\Omega_{xi}, \ldots, \Omega_k$.

The information processing apparatus 100, by comparing recognition class likelihood that is obtained by inputting the occluded movie data 90 to the 3D-CNN 50 and the reference likelihood, is able to determine whether a combination of areas corresponding to the series of occluded areas $\Omega_i$, the series of occluded areas $\Omega_{xi}, \ldots, \Omega_j$, and the series of occluded areas $\Omega_{xi}, \ldots, \Omega_k$ is an area that is important in identifying a class.

Furthermore, while the case has been described in which the information processing apparatus 100 uses the 3D-CNN when performing moving image recognition, embodiments are not limited to this example, and a technology other than the 3D-CNN may be applicable as long as a movie (width× height×the number of frames) is used as an input. For example, the information processing apparatus 100 may use video vision transformer as the moving image recognition.

Figure 9:
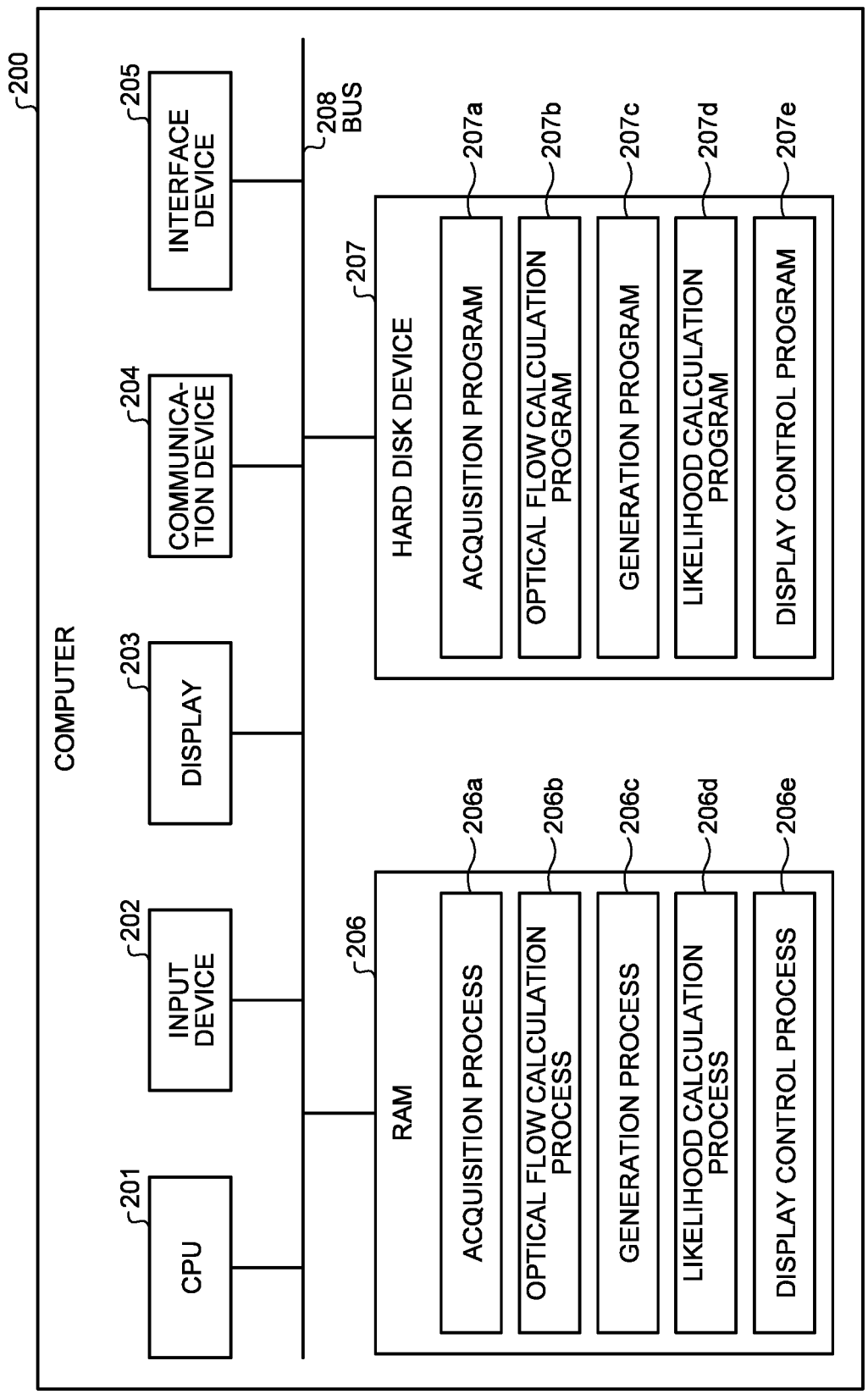
FIG. 9 is a diagram illustrating an example of a hardware configuration of a computer that implements the same functions as the information processing apparatus of the present embodiment.
Figure 10:
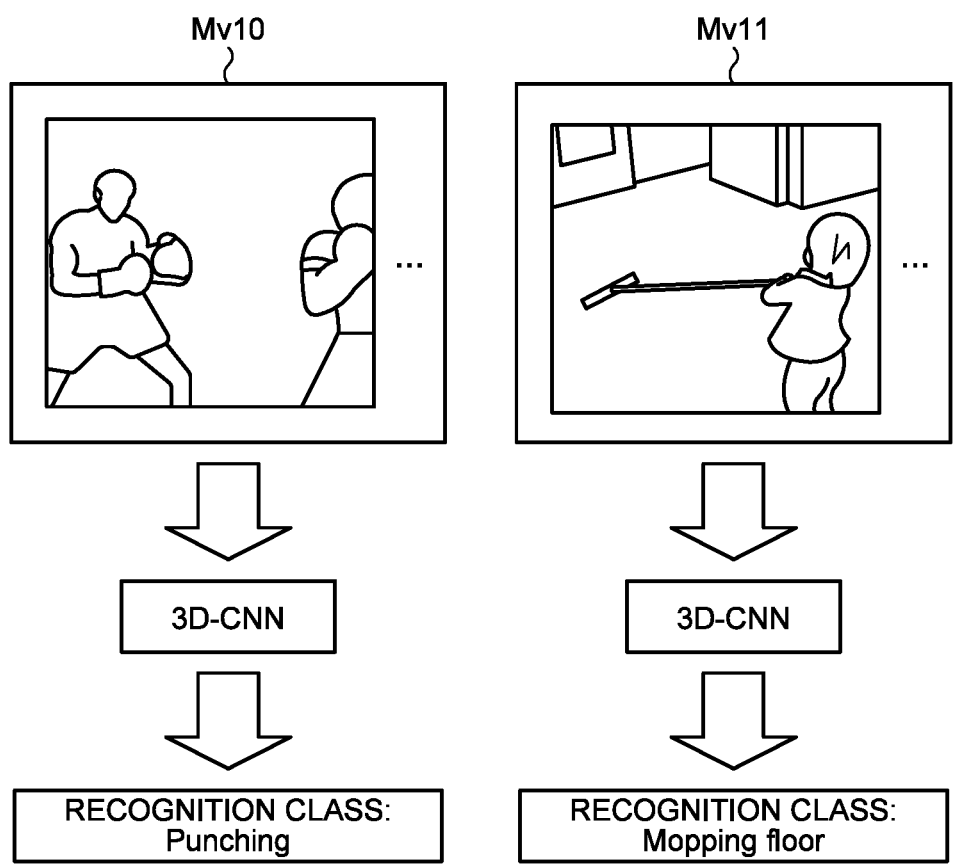
FIG. 10 is a diagram illustrating an example of a recognition result of moving image recognition.
Figure 11:
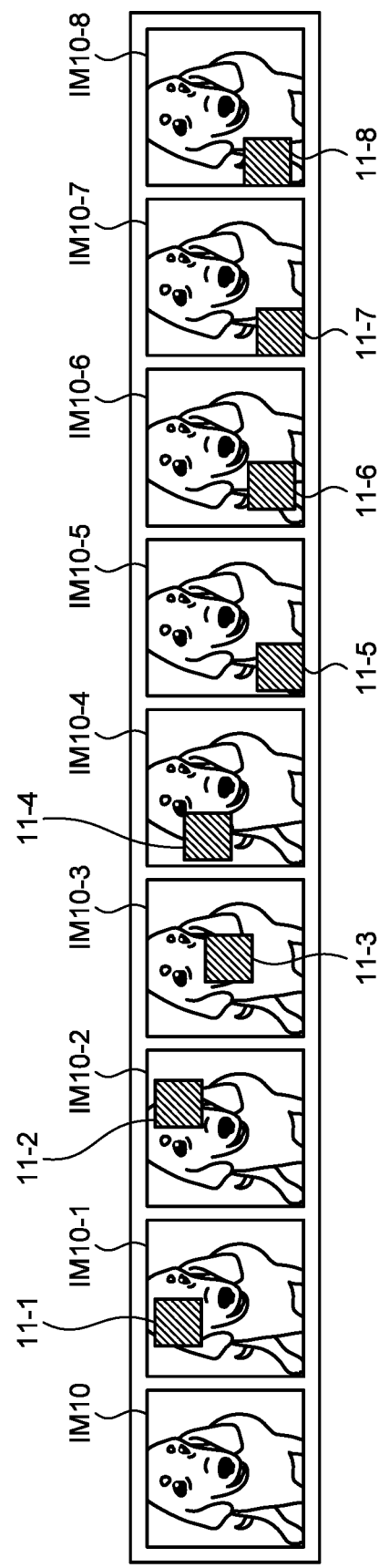
FIG. 11 is a diagram for explaining a conventional technology.
Figure 12:
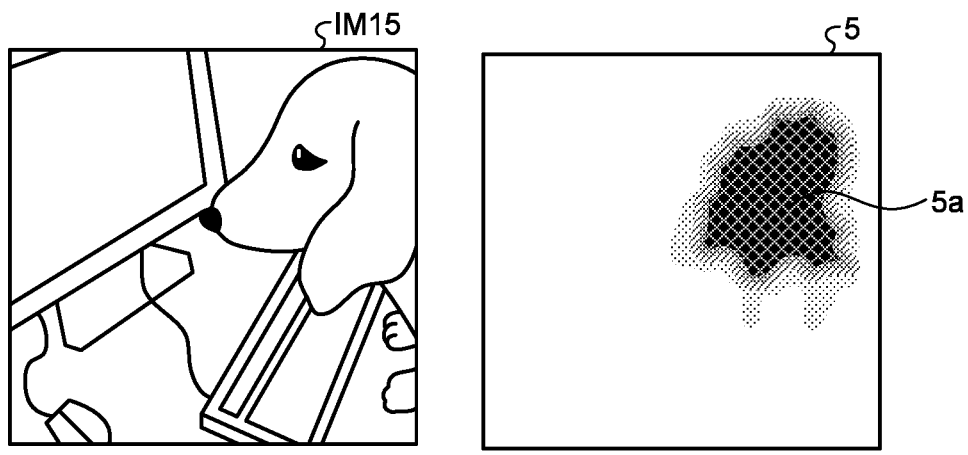
FIG. 12 is a diagram illustrating a processing result of the conventional technology.
Figure 13:
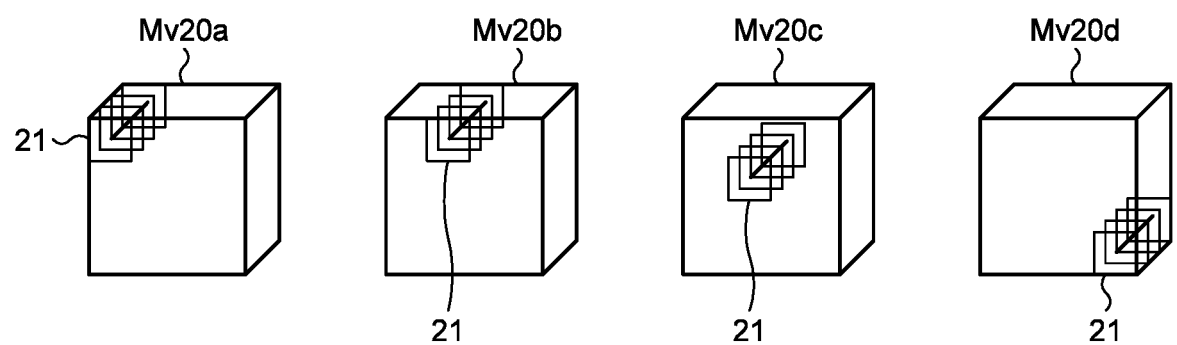
FIG. 13 is a diagram for explaining a problem with the conventional technology.

An example of a hardware configuration of a computer that implements the same functions as those of the information processing apparatus 100 illustrated in the embodiment as described above will be described below. FIG. 9 is a diagram illustrating an example of the hardware configuration of the computer that implements the same functions as those of the information processing apparatus of the embodiment.

As illustrated in FIG. 9, a computer 200 includes a CPU 201 that performs various kinds of arithmetic processing, an input device 202 that receives input of data from a user, and a display 203. Further, the computer 200 includes a communication device 204 that transmits and receives data to and from an external apparatus or the like via a wired or wireless network, and an interface device 205. Furthermore, the computer 200 includes a RAM 206 for temporarily storing various kinds of information, and a hard disk device 207. Moreover, each of the devices 201 to 207 is connected to a bus 208.

The hard disk device 207 includes an acquisition program 207a, an optical flow calculation program 207b, a generation program 207c, a likelihood calculation program 207d, and a display control program 207e. Further, the CPU 201 reads each of the programs 207a to 207e and loads the programs 207a to 207e onto the RAM 206.

The acquisition program 207a functions as an acquisition process 206a. The optical flow calculation program 207b functions as an optical flow calculation process 206b. The generation program 207c functions as a generation process 206c. The likelihood calculation program 207d functions as a likelihood calculation process 206d. The display control program 207e functions as a display control process 206e.

A process of the acquisition process 206a corresponds to the process performed by the acquisition unit 151. A process of the optical flow calculation process 206b corresponds to the process performed by the optical flow calculation unit 152. A process of the generation process 206c corresponds to the process performed by the generation unit 153. A process of the likelihood calculation process 206d corresponds to the process performed by the likelihood calculation unit 154. A process of the display control process 206e corresponds to the process performed by the display control unit 155.

Meanwhile, it is not always necessary to store each of the programs 207a to 207e in the hard disk device 207 from the beginning. For example, each of the programs may be stored in to "portable physical medium", such as a flexible disk (FD), a compact disk-ROM (CD-ROM), a digital versatile disk (DVD), a magneto-optical disk, or an IC card that is inserted into the computer 200. Further, the computer 200 may read and execute each of the programs 207a to 207e.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable recording medium having stored therein a visualization program that causes a computer to execute a process, the process comprising:
acquiring movie data including a plurality of consecutive frames;
calculating first likelihood of a class of the movie data by inputting the acquired movie data to a trained model that has been trained based on training data including input data of the movie data and output data of a class of the movie data;

calculating an optical flow indicating movement of an area included in the movie data, based on the movie data;

generating occluded movie data by setting an occluded area in each of the frames included in the movie data, based on the optical flow;

calculating second likelihood of a class of the occluded movie data by inputting the occluded movie data to the model;

identifying an area that affects identification of the class among areas in the movie data, based on the first likelihood and the second likelihood; and displaying the identified area that affects identification of the class.

2. The non-transitory computer-readable recording medium according to claim 1, wherein the identifying, when a difference between the first likelihood and the second likelihood is equal to or larger than a threshold, identifies an area that is included in each of the frames of the movie data and that is located at a position corresponding to an occluded area in each of frames of the occluded movie data, as the area that affects identification of the class.

3. The non-transitory computer-readable recording medium according to claim 1, wherein the generating generates the occluded movie data by setting the occluded area from a middle frame among the plurality of consecutive frames included in the movie data.

4. The non-transitory computer-readable recording medium according to claim 1, wherein the generating generates a plurality of pieces of occluded image data by repeating a process of setting an occluded area in each of the frames included in the movie data based on a plurality of optical flows, and generates a single piece of occluded image data by integrating occluded areas that are set in the plurality of pieces of occluded image data.

5. An information processing method comprising:

acquiring movie data including a plurality of consecutive frames;

calculating first likelihood of a class of the movie data by inputting the acquired movie data to a trained model that has been trained based on training data including input data of the movie data and output data of a class of the movie data;

calculating an optical flow indicating movement of an area included in the movie data, based on the movie data;

generating occluded movie data by setting an occluded area in each of the frames included in the movie data, based on the optical flow;

calculating second likelihood of a class of the occluded movie data by inputting the occluded movie data to the model;

identifying an area that affects identification of the class among areas in the movie data, based on the first likelihood and the second likelihood, by using a processor; and displaying the identified area that affects identification of the class.

6. The information processing method according to claim 5, wherein the identifying, when a difference between the first likelihood and the second likelihood is equal to or larger than a threshold, identifies an area that is included in each of the frames of the movie data and that is located at a position corresponding to an occluded area in each of frames of the occluded movie data, as the area that affects identification of the class.

7. The information processing method according to claim 5, wherein the generating generates the occluded movie data by setting the occluded area from a middle frame among the plurality of consecutive frames included in the movie data.

8. The information processing method according to claim 5, wherein the generating generates a plurality of pieces of occluded image data by repeating a process of setting an occluded area in each of the frames included in the movie data based on a plurality of optical flows, and generates a single piece of occluded image data by integrating occluded areas that are set in the plurality of pieces of occluded image data.

9. An information processing apparatus comprising:

a processor configured to:

acquire movie data including a plurality of consecutive frames;

calculate first likelihood of a class of the movie data by inputting the acquired movie data to a trained model that has been trained based on training data including input data of the movie data and output data of a class of the movie data;

calculate an optical flow indicating movement of an area included in the movie data, based on the movie data;

generate occluded movie data by setting an occluded area in each of the frames included in the movie data, based on the optical flow;

calculate second likelihood of a class of the occluded movie data by inputting the occluded movie data to the model;

identify an area that affects identification of the class among areas in the movie data, based on the first likelihood and the second likelihood; and display the identified area that affects identification of the class.

10. The information processing apparatus according to claim 9, wherein the processor is further configured to, when a difference between the first likelihood and the second likelihood is equal to or larger than a threshold, identify an area that is included in each of the frames of the movie data and that is located at a position corresponding to an occluded area in each of frames of the occluded movie data, as the area that affects identification of the class.

11. The information processing apparatus according to claim 9, wherein the processor is further configured to generate the occluded movie data by setting the occluded area from a middle frame among the plurality of consecutive frames included in the movie data.

12. The information processing apparatus according to claim 9, wherein the processor is further configured to generate a plurality of pieces of occluded image data by repeating a process of setting an occluded area in each of the frames included in the movie data based on a plurality of optical flows, and generate a single piece of occluded image data by integrating occluded areas that are set in the plurality of pieces of occluded image data.

* * * * *